United States Patent [19]

Mayers et al.

[11] Patent Number: 4,820,475

[45] Date of Patent: Apr. 11, 1989

[54] BURNABLE ABSORBER ROD PUSH OUT ATTACHMENT JOINT

[75] Inventors: Joseph B. Mayers, Greensburg; Robert K. Gjertsen, Monroeville; John F. Wilson, Murrysville, all of Pa.

[73] Assignee: Westinghouse Electric Corp., Pittsburgh, Pa.

[21] Appl. No.: 89,384

[22] Filed: Aug. 25, 1987

Related U.S. Application Data

[62] Division of Ser. No. 774,850, Sep. 12, 1985, abandoned.

[51] Int. Cl.$^4$ ................................................. G21C 7/04
[52] U.S. Cl. .................................... 376/327; 376/463; 29/523; 403/274
[58] Field of Search ............... 376/327, 446, 463, 353, 376/333; 403/261, 274, 247, 256; 29/515, 523

[56] References Cited

U.S. PATENT DOCUMENTS

| | | | |
|---|---|---|---|
| 2,848,803 | 8/1958 | Schock | 403/247 |
| 4,302,294 | 11/1981 | Leclercq | 376/446 |
| 4,303,476 | 12/1981 | Leclercq | 376/446 |
| 4,314,885 | 2/1982 | Edwards et al. | 376/327 |
| 4,381,283 | 4/1983 | Walton | 376/327 |
| 4,522,782 | 6/1985 | Leclercq | 376/446 |
| 4,535,523 | 8/1985 | Leclercq | 376/446 |
| 4,631,168 | 12/1986 | Shallenberger et al. | 376/446 |

FOREIGN PATENT DOCUMENTS

| | | | |
|---|---|---|---|
| 2460878 | 6/1976 | Fed. Rep. of Germany | 376/463 |
| 0067493 | 4/1984 | Japan | 376/327 |
| 1228610 | 4/1971 | United Kingdom | 376/446 |

*Primary Examiner*—Harvey E. Behrend

[57] ABSTRACT

A burnable absorber cluster assembly includes a support plate, a plurality of burnable absorber rods, and an improved attachment joint for detachably connecting an upper end of each of the absorber rods to the support plate. The attachment joint includes a plug insert defined on the end of each of the rods, a hollow annular wall extending outwardly from each plug insert, holes defined through the support plate for receiving the plug inserts, and recesses formed in the support plate and connected with the holes therein. Each recess is conical-shaped and extends in flared fashion outwardly from one hole to a maximum diameter greater than the diameter of the hole. The annular wall on each plug insert is deformed into conformity with the shape of one of the recesses for providing an interengaging connection between the insert plug and the support plate in which the plug insert is disposed within the support plate hole. The annular wall is also redeformable upon application of a predetermined axially-directed force on the plug insert so as to remove the plug insert from the support plate hole and thereby detach the rod from the support plate. Also, each recess and annular wall have respective interengaging eccentric portions which prevents the plug insert on each rod end from rotating in its corresponding hole.

1 Claim, 3 Drawing Sheets

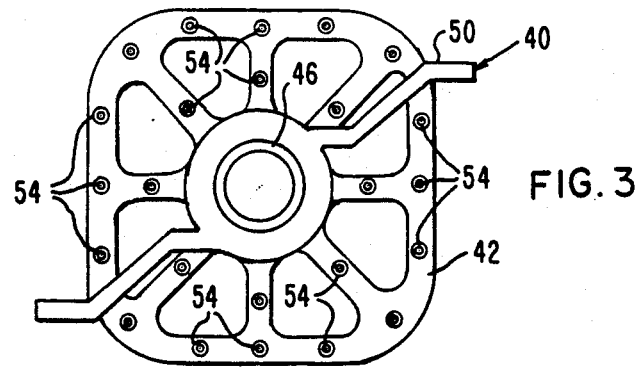
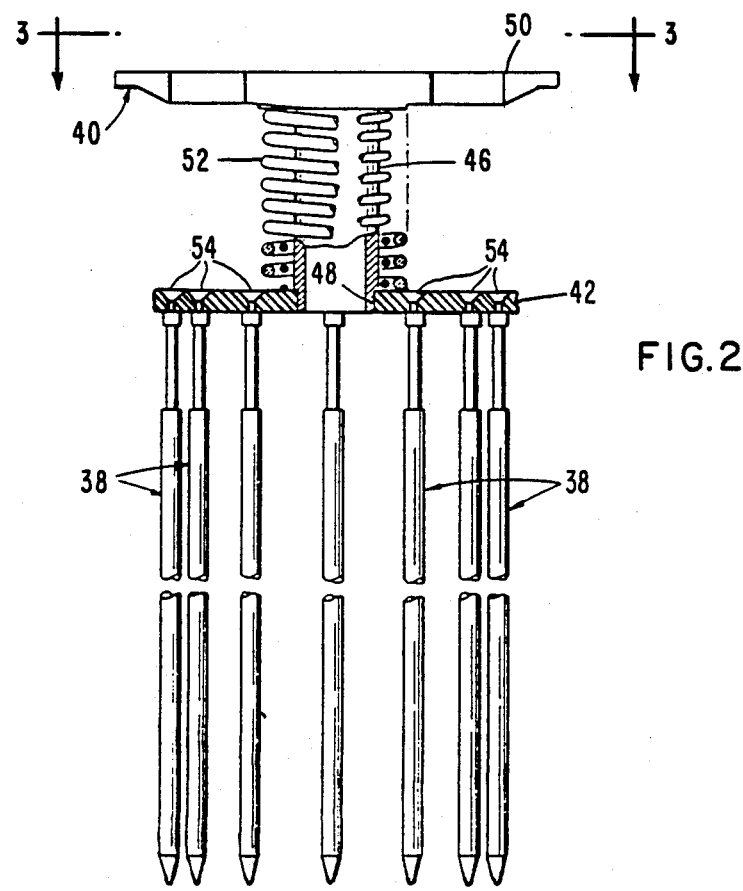

BURNABLE ABSORBER ROD PUSH OUT ATTACHMENT JOINT

This is a divisional of co-pending application Ser. No. 774,850, filed on Sept. 12, 1985, now abandoned.

CROSS REFERENCE TO RELATED APPLICATION

Reference is hereby made to the following copending U.S. patent application dealing with related subject matter and assigned to the assignee of the present invention: "Standardized Reduced Length Burnable Absorber Rods For A Nuclear Reactor" by Barry R. Cooney et al, assigned U.S. Ser. No. 718,902 and filed Apr. 1, 1985.

BACKGROUND OF THE INVENTION

1. Field of the Invention

The present invention relates generally to nuclear reactors and, more particularly, is concerned with a unique attachment joint for burnable absorber rods which allows easy detachment and consolidation of the spent absorber rods.

2. Description of the Prior Art

In a typical nuclear reactor, the reactor core includes a large number of fuel assemblies each of which is composed of top and bottom nozzles with a plurality of elongated transversely spaced guide thimbles extending longitudinally between the nozzles and a plurality of transverse support grids axially spaced along the guide thimbles. Also, each fuel assembly is composed of a plurality of elongated fuel elements or rods transversely spaced apart from one another and from the guide thimbles and supported by the transverse grids between the top and bottom nozzles. The fuel rods each contain fissile material and are grouped together in an array which is organized so as to provide a neutron flux in the core sufficient to support a high rate of nuclear fission and thus the release of a large amount of energy in the form of heat. A liquid coolant is pumped upwardly through the core in order to extract some of the heat generated in the core for the production of useful work.

Since the rate of heat generation in the reactor core is proportional to the nuclear fission rate, and this, in turn, is determined by the neutron flux in the core, control of heat generation at reactor start-up, during its operation and at shutdown is achieved by varying the neutron flux. Generally, this is done by absorbing excess neutrons using control rods which contain neutron absorbing material. The guide thimbles, in addition to being structural elements of the fuel assembly, also provide channels for insertion of the neutron absorber control rods within the reactor core. The level of neutron flux and thus the heat output of the core is normally regulated by the movement of the control rods into and from the guide thimbles.

Also, it is conventional practice to design an excessive amount of neutron flux into the reactor core at start-up so that as the flux is depleted over the life of the core there will still be sufficient reactivity to sustain core operation over a long period of time. In view of this practice, in some reactor applications burnable absorber or poison rods are inserted within the guide thimbles of some fuel assemblies to assist the control rods in the guide thimbles of other fuel assemblies in maintaining the neutron flux or reactivity of the reactor core relatively constant over its lifetime. The burnable poison rods, like the control rods, contain neutron absorber material. They differ from the control rods mainly in that they are maintained in stationary positions within the guide thimbles during their period of use in the core. The overall advantages to be gained in using burnable poison rods at stationary positions in a nuclear reactor core are described in U.S. Pat. Nos. 3,361,857 to Rose and 3,510,398 to Wood.

With the increased use of an 18-month fuel cycle in operation of nuclear reactors in contrast to the more usual 12-month cycle, the need to consolidate spent burnable absorber assemblies, in an efficient manner, has become an important factor in the overall reactor fuel servicing. Previously with the use of the 12-month fuel cycle, burnable absorber assemblies were only required in the first cycle and so the spent absorber assemblies could be stored with the spent fuel assemblies. Now, in the 18-month fuel cycle, burnable absorber assemblies are required in the second and third cycles of the fuel. Thus, there are more spent absorber assemblies generated than there are spent fuel assemblies so all of the spent absorber assemblies cannot be stored in spent fuel assemblies. This means that the absorber rods must be consolidated to save space in the spent fuel pool.

The present design of the burnable absorber cluster assembly, for example as illustrated and described in the patent application cross-referenced above, does not lend itself to consolidation since the upper ends of the rods are fastened to a base or support plate of the assembly with threaded connections which are locked in place. To remove the rods from the support plate it is necessary to shear the rods therefrom which is not an easy task to perform remotely while the irradiated assembly is submerged in water.

Consequently, a need exists for a different approach to attaching the absorber rods to the support plate which will still ensure that the rods are held securely in their desired positions within the guide thimbles during use in the fuel assembly in the reactor core, but after being used up will allow easy detachment of the spent rods from the support plate in order to facilitate their efficient consolidation in the spent fuel pool.

SUMMARY OF THE INVENTION

The present invention provides a burnable absorber rod push out attachment joint designed to satisfy the aforementioned needs. The modifications to the burnable absorber assembly necessary to implement the push out attachment joint of the present invention is probably slightly less expensive than the present threaded connection and will not adversely affect reliability of the absorber assembly. However, most of the benefits to be gained from the attachment joint of the present invention are realized when it comes time to consolidate the spent absorber rods. Most importantly, the attachment joint allows the spent rod to be detached from the support plate without the complication of having to shear or cut it remotely. Instead, detachment of the spent rod is achieved from above by simply pushing down on its upper end using a suitable tool which causes the joined interlocking portion of the upper end to deform slightly and thereby release from an opening in the assembly support plate through which it was lodged and attached to the support plate.

Accordingly, the present invention sets forth in a cluster assembly including a support plate and at least one burnable absorber rod, an attachment joint for detachably connecting an end of the absorber rod to the support plate, comprising: (a) a plug insert defined on the end of the rod; (b) means defining at least one hole through the support plate for receiving the plug insert; and (c) attaching means connected with at least one of the support plate hole-defining means and the plug insert and being deformable for securing the plug insert in an interengaging connection to the support plate in which the plug insert is disposed within the support plate hole, the attaching means also being redeformable upon application of a predetermined axially-directed force on the plug insert so as to remove the plug insert from the support plate hole and thereby detach the rod from the support plate. Also, the attaching means includes an eccentric portion which prevents the plug insert on the rod end from rotating in the hole.

More particularly, in the preferred embodiment, the attaching means of the attachment joint includes a hollow annular wall extending outwardly from the plug insert on the rod end and means defining a conical-shaped recess in the support plate connected with the hole therein. The recess is flared outwardly from the hole to a maximum diameter greater than the diameter of the hole. Also, the annular wall on the plug insert is deformed into conformity with the shape of the recess. Further, the eccentric portion which prevents the plug insert from rotating in the hole includes means defining a cavity in the support plate being connected in offset relation to the recess, and a portion of the annular wall deformed into the offset cavity.

In one modified embodiment, the attaching means of the attachment joint includes means defining a concave-shaped groove in the support plate within the hole therein, and the annular wall on the plug insert is deformed into conformity with the shape of the groove. In another modified embodiment, the attaching means includes a solid section extending outwardly from the plug insert on the rod end and beyond the hole in the support plate. A collar is attached on the solid section of the plug insert and has an outside diameter greater than that of the hole. Also, the solid section has a concave groove formed therein and the collar has a portion bulged into the groove so as to attach the collar to the section.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 2 is an enlarged elevational view of the absorber rod cluster assembly of FIG. 1 removed from the fuel assembly, showing the rod cluster assembly in vertically foreshortened and partly sectioned form.

FIG. 3 is a top plan view of the rod cluster assembly as seen along line 3—3 of FIG. 2.

DETAILED DESCRIPTION OF THE INVENTION

Figure 1:
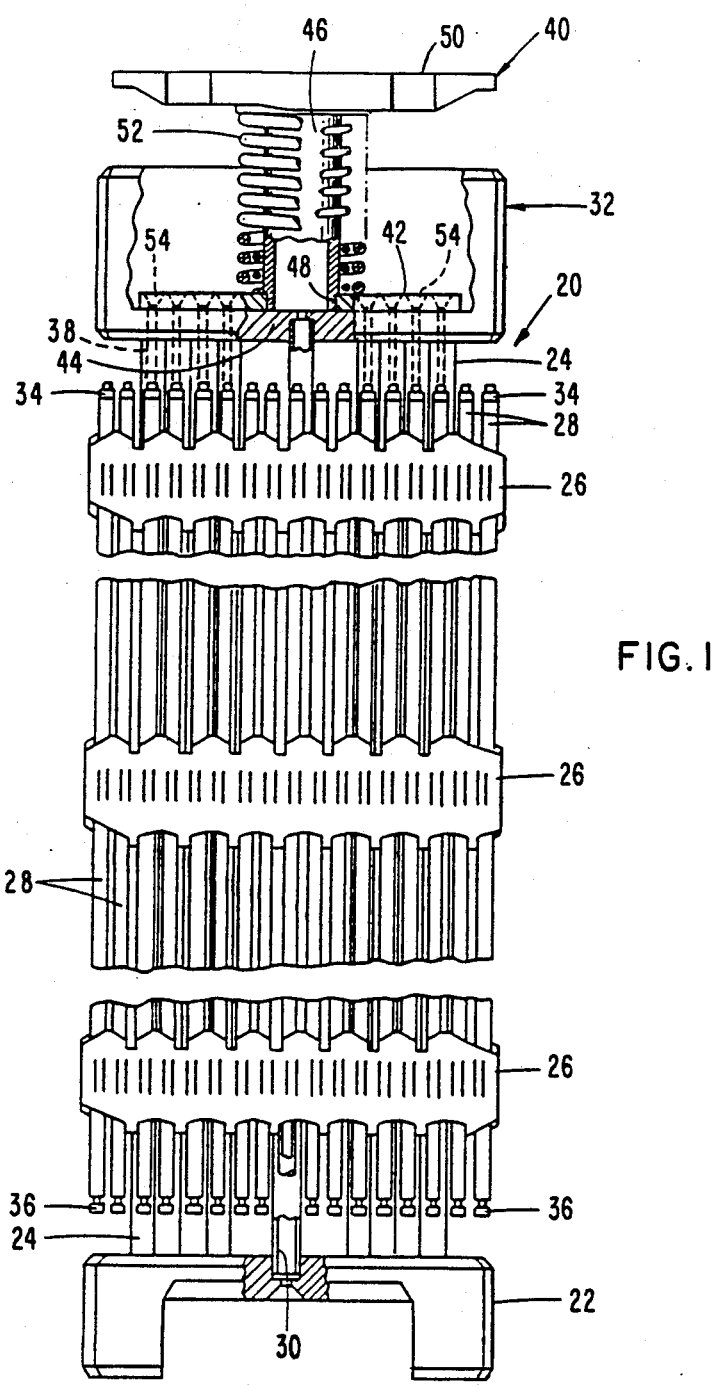
FIG. 1 is an elevational view, partly in section, of a fuel assembly which incorporates a cluster assembly of burnable absorber rods employing the attachment joint of the present invention, the assembly being illustrated in vertically foreshortened form with parts broken away for clarity.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a fuel assembly, represented in vertically foreshortened form and being generally designated by the numeral 20. The fuel assembly 20 is the type used in a pressurized water reactor (PWR) and basically includes a lower end structure or bottom nozzle 22 for supporting the assembly on the lower core plate (not shown) in the core region of a reactor (not shown), and a number of longitudinally extending guide tubes or thimbles 24 which project upwardly from the bottom nozzle 22. The assembly 20 further includes a plurality of transverse grids 26 axially spaced along the guide thimbles 24 and an organized array of elongated fuel rods 28 transversely spaced and supported by the grids 26. Also, the assembly 20 has an instrumentation tube 30 located in the center thereof and an upper end structure or top nozzle 32 attached to the upper ends of the guide thimbles 24. With such an arrangement of parts, the fuel assembly 20 forms an integral unit capable of being conventionally handled without damaging the assembly parts.

As mentioned above, the fuel rods 28 in the array thereof in the assembly 20 are held in spaced relationship with one another by the grids 26 spaced along the fuel assembly length. Each fuel rod 28 includes nuclear fuel pellets (not shown) and the opposite ends of the rod are closed by upper and lower end plugs 34,36. The fuel pellets composed of fissile material are responsible for creating the reactive power of the PWR. A liquid moderator/coolant such as water, or water containing boron, is pumped upwardly through the fuel assemblies of the core in order to extract some of the heat generated therein for the production of useful work.

Burnable Absorber Rod Cluster Assembly

In the operation of a PWR it is desirable to prolong the life of the reactor core as long as feasible to better utilize the uranium fuel and thereby reduce fuel costs. To attain this objective, it is common practice to provide an excess of reactivity initially in the reactor core and, at the same time, provide means to maintain the reactivity relatively constant over its lifetime.

Such means commonly takes the form of a cluster of reduced length burnable absorber rods 38 supported by a holddown assembly 40. As seen in FIG. 1, the holddown assembly 40 stationarily supports the absorber rods 38 in the guide thimbles 24 of some of the fuel assemblies 20 to assist the movable control rods (not shown) in the guide thimbles of other assemblies (not shown) in maintaining a substantially constant level of neutron flux or reactivity in the core throughout its operating cycle.

Referring now to FIGS. 2 and 3, in addition to FIG. 1, the holddown assembly 40 which supports the absorber rods 38 in spaced side-by-side relationship includes a lower flat perforated support plate 42 which fits within the fuel assembly top nozzle 32 and rests on the adapter plate 44 of the top nozzle. The holddown assembly 40 also includes a sleeve 46, being attached at its lower end within a central opening 48 in the support plate 42 and extending upwardly therefrom, and an upper holddown plate 50 which receives the sleeve 46 and is slidable vertically along it. Further, a holddown coil spring 52 is disposed about the sleeve 46 and extends between the lower support plate 42 and the upper holddown plate 50. Thus, the support plate 42 is held down against the top nozzle adapter plate 44 by the coil spring 52 which is compressed by the upper core plate (not shown) acting through the upper holddown plate 50 which abuts the upper core plate. This arrangement assures that the absorber rods 38 which are attached to the support plate 42 cannot be ejected from the reactor core by coolant flow forces while any thermal growth of the rods is accommodated.

Absorber Rod Push Down Attachment Joint

Heretofore, each of the burnable absorber rods had a threaded upper end, such as seen in the cross-referenced application, by which the rod was connected to the support plate 42. Such threaded connection presented complications when attempting to detach the rods 38 from the holddown assembly 40 in order to consolidate them for storage once they have reached a spent condition. The push out attachment joint of the present invention, as seen in FIG. 1, and better yet in FIGS. 4 and 5, and being generally identified by the numeral 54, was originated to overcome and eliminate such complications.

Referring to FIGS. 4 to 9, there is shown the preferred embodiment of the push out attachment joint 54 for detachably connecting the upper end 56 of each absorber rod 38 to the support plate 42. Basically, the attachment joint 54 includes a plug insert 58 defined on the upper end 56 of each absorber rod 38, a hole 60 defined through the support plate 42 for receiving each plug insert 58, and attaching means, generally designated 62, for securing the plug insert 58 in an interengaging connection in the hole 60 and thereby connecting each absorber rod 38 to the support plate 42.

Figure 4:
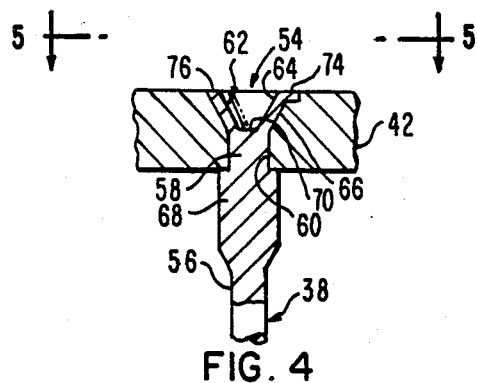
FIG. 4 is an enlarged view of a fragmentary portion of the absorber rod cluster assembly of FIG. 2, the portion including the upper end of one absorber rod and part of the support plate surrounding the rod and illustrating, in sectional form, the preferred form of the attachment joint of the present invention which detachably connects each absorber rod to the cluster assembly support plate.
Figure 5:
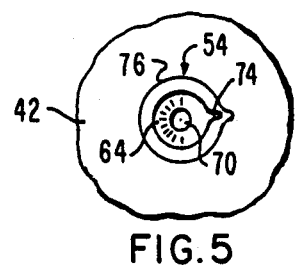
FIG. 5 is a top plan view of the attachment joint between the rod and support plate, as seen along line 5—5 of FIG. 4.
Figure 6:
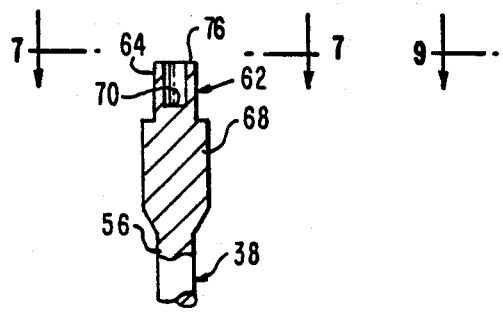
FIG. 6 is a sectional view of the attaching structure on the upper end of an absorber rod before formation of the attachment joint connecting the rod to the plate.
Figure 8:
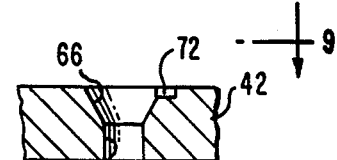
FIG. 8 is a sectional view of the attaching structure on the assembly support plate before formation of the attachment joint connecting the rod to the plate.
Figure 7:
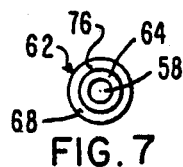
FIG. 7 is a top plan view of the attaching structure on the upper end of the absorber rod, as seen along line 7—7 of FIG. 6.
Figure 9:
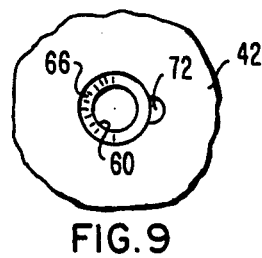
FIG. 9 is a top plan view of the attaching structure on the support plate, as seen along line 9—9 of FIG. 8.

In its preferred embodiment as seen in FIGS. 6 to 9, the attaching means 62 includes a thin hollow annular wall 64 extending axially outwardly from the plug insert 58 on the rod upper end 56 and a conical-shaped recess 66 defined in the support plate 42 and connected with the hole 60 therein. As shown in FIGS. 8 and 9, the recess flares or tapers outwardly from the hole 60 from the diameter of the latter to a maximum diameter greater than the diameter of the hole 60. Before the joint 54 is formed, the hollow annular wall 64 on the plug insert 58 is generally cylindrical in shape, as seen in FIGS. 6 and 7. After the joint 54 is completed as illustrated in FIGS. 4 and 5, the annular wall 64 has a deformed shape in which it conforms with the conical shape of the recess 66. Such interengaging connection formed by the annular wall 64 deformed into contact with the conical-shaped recess 66 together with the larger diameter flange 68 on the upper rod end 56 below the plug insert 58 which contacts the bottom side of the support plate 42 maintains the plug insert 58 within the support plate hole 60 so as to rigidly attach each absorber rod 38 to the support plate 42.

However, the annular wall 64 is redeformable upon application of a predetermined downwardly and axially-directed force on the plug insert 58 so as to remove the plug insert 58 from the support plate hole 60 by forcibly pushing the plug insert 58 out of the hole. The center 70 of the deformed wall 64 provides a pilot hole for receipt of an appropriate punch tool (not shown) for driving the plug insert 58 downwardly and concurrently straightening the wall 64 enough to allow passage through the hole 60 and thereby detachment of the absorber rod 38 from the support plate.

In order to prevent the plug insert 58, and thereby the absorber rod 38, from rotating in the support plate hole 60, the attaching means 62 of the attachment joint 54 also includes an eccentric portion which is located in offset relation to the axes of the absorber rod 38 and support plate hole 60. The eccentric portion of the attaching means 62, as seen in FIGS. 6, 8 and 9, is in the form of a groove or cavity 72 defined in the support plate 42 adjacent the outer periphery of the recess 66 and connected therewith in an offset relation thereto. When the annular wall 64 is deformed to its conical shape to complete the joint 54, a small portion 74 of the material of the peripheral rim or edge 76 of the annular wall 64 is pressed into the offset cavity 72. In such manner, the deformed annular wall 64 and plug insert 58 are anchored against rotation relative to the recess 66 and hole 60. However, the wall portion 74 readily slides out of the cavity 72 as the wall 64 is redeformed during detachment of the absorber rod 38 from the support plate 42.

Figure 10:
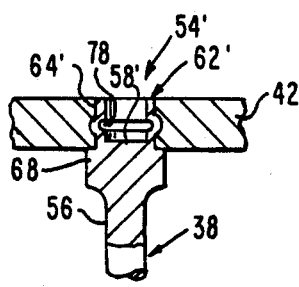
Fig. 10 is a sectional view similar to that of FIG. 4, but showing a modified embodiment of the attachment joint of the present invention.
Figure 11:
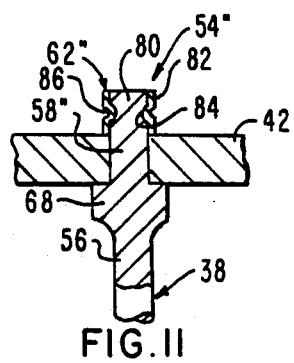
FIG. 11 is another sectional view similar to that of FIGS. 4 and 10, but showing another modified embodiment of the attachment joint of the present invention.

In one modified embodiment illustrated in Fig. 10, the push out attachment joint 54' has attaching means 62' in the form of a concave-shaped groove 78 in the support plate 42 within the hole 60 therein and the annular wall 64' on the plug insert 58' is deformed into conformity with the shape of the groove 78. Rotation can be prevented by the provision of eccentric means similar to that shown in relation to the preferred embodiment. Another modified embodiment of the attachment joint 54" is shown in FIG. 11. There, the attaching means 62" is in the form of a solid section 80 extending outwardly from the plug insert 58" and beyond the hole 60 in the support plate 42 and a collar 82 slid over and attached on the solid section 80 of the plug insert 58" and having an outside diameter greater than that of the hole 60. The solid section 80 has a concave groove 84 formed therein and the collar 82 has a portion 86 bulged into the groove 84 so as to attach the collar to the plug insert section. Rotation can be prevented in a way similar to that shown in the preferred embodiment.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In a cluster assembly including a support plate and at least one burnable absorber rod, an attachment joint for detachably connecting an upper end of said absorber rod to said support plate, comprising:
   (a) a plug insert defined on said upper end of said rod;
   (b) means defining at least one hole through said support plate for receiving said plug insert and defining an annular groove having a concave cross-sectional shape in said support plate within said hole therein;
   (c) said plug insert being a cylindrical hollow annular uninterrupted wall disposed within said support plate hole and having a cavity coextensive with the depth of said hole in said support plate for allowing deformation of said wall into conformity with said groove in said hole to provide an interengaging nonthreaded connection to said support plate; and
   (d) an enlarged lower flange being solid in cross-section and integrally formed on said upper end of said rod with and below said annular wall of said plug insert to form a bottom of said plug insert cavity at the level of a bottom side of said support plate, said flange being disposed at its upper end in contact with said bottom side of said support plate about said hole such that together with said deformed annualar wall said flange maintains said plug insert in said hole of said support plate;
   (e) said annular wall of said plug insert being redeformable out of conformity with the shape of said groove in said hole of said support plate upon application of a predetermined axially-directed force on said plug insert so as to remove said plug insert from said support plate hole and thereby detach said rod from said support plate.

* * * * *